Oct. 5, 1954

R. B. BUCHNER 2,691,067

LINE FINDER CIRCUIT-ARRANGEMENT

Filed July 29, 1949

2 Sheets-Sheet 1

INVENTOR.
ROBERT BERTOLD BUCHNER
BY
Max M. Vogel
AGENT.

LINE FINDER CIRCUIT-ARRANGEMENT

Filed July 29, 1949 2 Sheets-Sheet 2

INVENTOR.
ROBERT BERTOLD BUCHNER
BY [signature]
AGENT.

Patented Oct. 5, 1954 2,691,067

UNITED STATES PATENT OFFICE 2,691,067

LINE FINDER CIRCUIT-ARRANGEMENT

Robert Bertold Buchner, Eindhoven, Netherlands, assignor to Hartford National Bank and Trust Company, Hartford, Conn., as trustee Application July 29, 1949, Serial No. 107,414

Claims priority, application Netherlands August 12, 1948

4 Claims. (Cl. 179—18)

This invention relates to line finder circuit-arrangements for automatic signalling systems, for example telephone systems, for establishing a connection between a calling line and a register and/or a group selector by means of line finders in at least two successive stages.

Known arrangements, in which a connection is made from the calling line and in which, consequently, in succession a first line finder, a second finder and so forth are stepped, have a limitation in that each line finder requires a device which tests the outlets and controls the stepping action.

In a further known arrangement, the stepping of the line finders is effected with the use of a device common to a group of lines which, when a call is made, is actuated and transmits a start signal to a control device in a register. Under the control of this control device, the line finders then select a path back to the calling line. This arrangement has the advantage that actuation and stopping of the switches and testing of the successive outlets is effected under the control of a single control-device which, after a connection has been established, is released and may be used for other purposes, for example for controlling the stepping of group selectors.

Since the calling line can be reached from the register only by way of definite line finders, a path to be selected must be distinguished from paths which do not give access to the calling line.

In the known circuit-arrangement, the register is connected, after a start signal has been produced, through an auxiliary finder, to the device which is actuated when a call is made and receives from the device identification signals characteristic of the group of lines in which the calling line is to be found. Thus the control device is capable of ascertaining through which groups of line finders the connection must pass. The outlets of line finders, to which several groups of line finders are connected, are distinguishable from one another since direct voltages of different values are applied to the marking contacts of the outlets. When stepping the line finders, the control-device tests the value of the marking voltages of the outlets successively engaged and stops the line finder on reaching a desired free outlet. For the transmission of the identification signals, this method requires an additional connection between the device which is actuated when a call is made and the register. Furthermore, the control-device is comparatively complicated.

In the copending patent application filed April 12, 1949, Serial Number 86,872, now abandoned, it is suggested to mark the line finders in a definite path in a direct manner. For this purpose, upon initiation of a call, a call detector which responds when a call is made actuates a marking device. The marking device makes a choice from the available free line finders of each stage through which the desired connection can be established and marks the outlets, corresponding to the selected line finders, of the line finders of a preceding stage by applying an identification voltage to these outlets by way of a distributor arrangement. The outlets of the first line finders, to which the calling line is connected, are also marked by a voltage.

Upon reception of a signal indicating that a calling line is to be found, the control-device actuates a line finder stepping it to the marked outlet, actuates the line finder of the next following stage connected to the outlet, stepping it likewise and so forth until the calling line is found. After a line finder has been stopped, the identification voltage is removed, for example by connecting the marking contact to earth.

In this system, preferably only one of the outlets of each stage through which the calling line can be reached, is marked, since otherwise there would be a risk that a second line finder, finding a path to another calling line which can be reached only by way of a further group of outlets, would arrive at a dead end. However, if there is a second call from a group of lines by way of which the group of outlets concerned gives access, a second outlet can safely be marked simultaneously. When the calling line can be reached by way of all outlets of a group of line finders, it is futile to mark only one of the outlets and any desired free outlet may be selected.

The circuit-arrangement according to the invention has several advantages over the aforesaid systems.

In the present circuit-arrangement all those idle outlets of line finders, through which a connection with the calling line can be established, are marked by an identification voltage. These outlets are preferably distributed evenly among the contact banks, so that the number of steps to be taken by a switch before it finds a desired outlet, is reduced to a minimum, this reduction being of advantage in regard to the life of the switch and the time of stepping.

The circuit-arrangement according to the invention is characterized in that the marking contacts of that group of outlets of second line finders, to which the first line finders associated with the line group of the calling line are connected, by way of a resistance and a contact of a busy relay of a first line finder, which contact opens after stepping of this line finder, to a point which is common to the group of first line finders which point is connected, by way of a second resistance, to a further point to which a voltage is supplied during the call such that a second line finder is caused to stop at an outlet marked by this voltage, the control device after the second line finder is stopped, causing the voltage of the marking contact and consequently that of the marking contacts connected to the common point for the second line finder group to vary such that a further switch cannot stop during the call at one of the outlets of the group concerned.

The point to which the voltage is fed is preferably common to the group of lines which are connected to the outlets of the group of first line finders. If desired, such a point may also be added to some subgroups, for example, to each individual line.

The group of outlets of the second line finders is busy until the first line finder engaged has been caused to stop at the calling line and, upon the relay contact being opened, the connection between the marking contact of the second line finder and the common point of the group of first line finders is interrupted. When the first line finder stops, the voltage of the point added to the line or line group is also removed, assuming at least that there is no waiting call in the line group, so that the identification voltage on the marking contacts of the remaining outlets of the group concerned of second line finders does not return. Consequently, there is no risk that a line finder, which is required to establish a connection over other outlets of the second line finders, lands on a dead end.

If it is necessary to mark also line finders of preceding stages, the common points of these groups of line finders are each connected by way of a resistance, to each of the points associated with the lines or attainable through these groups of line finders. In order to avoid that, upon a call in a definite line group, line finders would be marked which do not give access to this line group, rectifiers are connected between the resistances and the common points of line finder groups in stages preceding first line finder.

It is to be noted that the use of rectifiers for decoupling purposes is known per se.

After a line finder has been stopped at a marked outlet, the voltage of the marking contact is varied in a manner such that this outlet and furthermore all other outlets of the group are engaged. The common point is furthermore connected, through rectifiers, to common points of preceding stages of line finders in such manner that the said outlets remain engaged until the desired connection has been completely established. However, if a call occurs in a second line group, over which the connection by way of these outlets must be passed, owing to the fact that the common point of the line finder group additionally receives voltage from the common point of the second line group through a resistance, there is avoided a condition in which outlets other than the engaged outlet are engaged.

In order that the invention may be more clearly understood and readily carried into effect, it will now be described more fully with reference to the accompanying drawings which represent, by way of example, embodiments of the circuit arrangement according to the invention.

Figure 1:
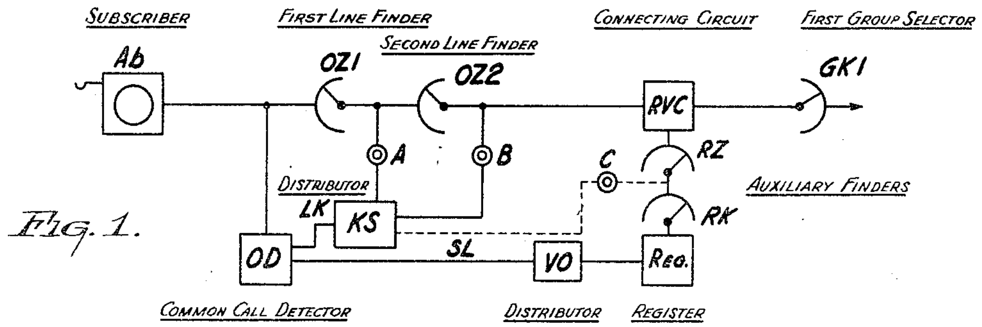
Fig. 1 shows diagrammatically part of the line finder part of a telephone exchange, in which the marking arrangement according to the invention may be used.

Referring now to Fig. 1, a subscriber's station *Ab* is required to be connected, through a number of line finders connected in cascade relation, to a register *Reg.* The subscriber forms part of a group of, say, 100 subscribers connected to a group of first line finders OZ1. The subscriber group is associated with a common call detector OD. When a subscriber lifts the receiver, the call detector becomes operative and transmits, by way of a line SL and a distributor arrangement VO, a signal to a free register *Reg.* to indicate that a subscriber is to be found. This signal contains no indication of the subscriber group from which the call originates.

By means of the auxiliary finders RK and RZ, the register is connected to a free connecting circuit RVC which is either permanently connected to a first group selector GK1 or which is, if desired, connected to a first group selector through the switch GK1.

The desired connection to the calling subscriber must be established through the line finders RK, RZ, a second line finder OZ2 and the first line finder OZ1. The number of line finder stages may, in total, also be higher or lower than that shown in Fig. 1.

As a rule, the subscriber group concerned cannot be reached by way of each of the connecting circuits connected to the outlets of RZ. In this event, a definite selection must be made from the available free outlets.

For this purpose, all free outlets through which the connection may be established are marked upon initiation of a call, by providing one of the contacts of each outlet (marking contact), by means of a distributor arrangement KS, with an identification voltage by way of a point B. Furthermore, identification voltage is provided for the same purpose, by the distributor arrangement KS by way of point A, to those outlets of second line finders OZ2 to which the first line finders OZ1 associated with the subscriber group are connected.

The finders RZ, OZ2 and OZ1 are now successively stepped by the control-device in the register to one of the marked outlets, this outlet being subsequently marked engaged. As a rule, the remaining outlets of each group are also engaged. As soon as the connection has been established, the distributor arrangement becomes inoperative.

It may happen that two subscribers start a call approximately at the same instant, the first subscriber engaging a first register *Reg.* 1 and then a first connecting circuit RVC1 by way of a line finder RZ1, and the second subscriber engaging a second register *Reg.* 2 and a second connecting circuit RVC2 by way of a line finder RZ2.

Various situations may then occur. In the first place, it is assumed that the subscribers can be reached through various groups of outlets of the line finders RZ i. e. the first subscriber through a first group, the second subscriber through a second group. It is then possible that auxiliary line finder RZ2 reaches one of the outlets of the first group after auxiliary line finder RZ1 has been stepped to another of the outlets and this first connection may already have proceeded to a further stage.

In this event auxiliary line finder RZ2 is not permitted to stop at one of these outlets, since otherwise the second connection would reach a dead end. As soon as line finder RZ1 has been stepped to an outlet of the first group, all outlets of this group must be marked engaged until the first connection has been completed.

If line finder RZ2 reaches one of the marked outlets of the first group earlier than RZ1, then RZ2 will stop at this outlet, the remaining outlets of the first group being marked engaged at the same time. RZ1 then finds one of the outlets of the second group. Consequently the final result will be that the first subscriber will be connected to the second register and the second subscriber to the first register. Consequently, the registers have merely changed subscriber, which is in no way undesirable.

If the subscribers can be reached by way of the same group of outlets of RZ, only one group of outlets will consequently be marked.

After one of the line finders RZ has been stepped to one of the outlets of the group, the other outlets must, in this event, preferably not be marked engaged, since otherwise the other connection could not be completed or would have to wait until the first connection was established.

Similar situations may occur in the subsequent line finder stages.

Therefore, the distributor arrangement is designed such that, as soon as a line finder is stopped at an outlet, the other outlets are marked and held engaged by varying the voltage of the marking contact in such manner that a further line finder cannot stop at one of these other outlets, except if a second call is made, for which the connection must be built up through the group of outlets concerned.

Examples of such distributor arrangements will now be described with reference to Figs. 2 to 4.

Figure 2:
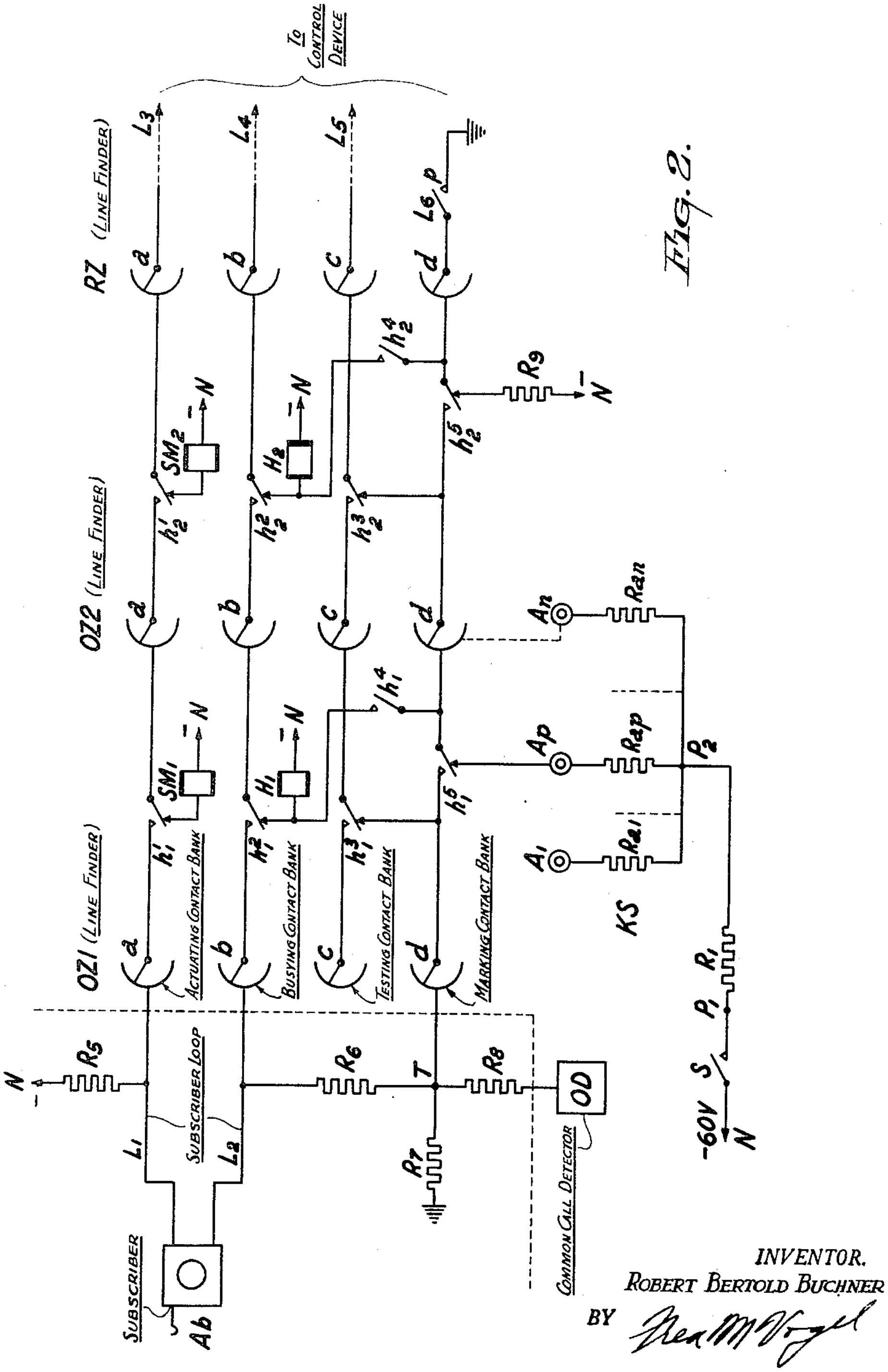
Fig. 2 shows one form of a marking arrangement if only one stage of line finders need be marked.

Fig. 2 shows three line finders OZ1, OZ2 and RZ of successive groups, of which the outlets are multiple connected, in a known manner (not further described) to the corresponding outlets of other line finders. A subscriber's station *Ab* is connected by way of speech conductor $L_1$ and $L_2$ to one of the outlets of the first line finders OZ1. In this arrangement use is made of a call detector arrangement known per se.

The speech conductor $L_1$ is connected by way of a resistance $R_5$ to the negative terminal N of a battery, of which the positive terminal is earthed. The speech conductor $L_2$ is connected, through a resistance $R_6$, to a point T which is connected to the marking contact in the outlet of first line finder OZ1 and is also connected through a resistance $R_7$, to earth and, by way of a decoupling resistance $R_8$, to a call detector OD common to the subscriber group.

This arrangement operates as follows. As long as the subscriber does not make a call, the subscriber's loop through the conductors $L_1$ and $L_2$ and the subscriber's telephone is open. In this event, point T is at earth potential. When the subscriber lifts the receiver, a circuit is completed from the negative terminal of the battery N, resistance $R_5$, conductor $L_1$, subscriber's station *Ab*, conductor $L_2$, resistance $R_6$ and resistance $R_7$ to earth. Due to this, point T attains a negative potential such that the call detector OD is made operative through resistance $R_8$. A start signal is transmitted by the call detector OD to a free register, the marking contact attaining a potential such that line finder OZ1 is stopped on the contact thus marked. After the line finder OZ1 has been stopped, point T is earthed through the *d*-wiper of line finder OZ1, so that point T again is at earth potential and the call detector is made inoperative. After the register has received the start signal, the control-device controls the successive line finders.

It is assumed that the subscriber can be reached through each of the outlets of the line finder RZ, so that the control-device, which must be imagined to be connected to the wipers of line finder RZ by way of conductors $L_3$, $L_4$, $L_5$ and $L_6$ is capable of stepping line finder RZ to any free outlet.

The marking contacts of free outlets associated with wiper *d* may consequently be marked in a known manner by supplying a suitable voltage to them, by way of a resistance $R_9$. The marking contacts of engaged outlets are earthed, for example by way of the *d*-wipers.

After line finder RZ has been stepped in a known manner, the engaged second line finder OZ2 must be positioned on one of the outlets to which a first line finder, giving access to the subscriber, is connected. The marking contacts of these outlets are each connected, by way of the rest contact $h^5{}_1$ of a busy relay $H_1$ and by way of one of resistances $R_{a1}$–$R_{an}$ to a common point $P_2$ which is furthermore connected to a point $P_1$ by way of resistance $R_1$.

As long as the call detector OD is operative, i. e. as long as one or more subscribers of the line group concerned are calling and all the calling subscribers have not been found, contact S of the call detector is closed and point $P_1$ is connected to the negative terminal N of the battery, so that point $P_1$ is at a potential of, say —60 v. This voltage is transmitted, by way of resistance $R_1$ and resistances $R_a$, to the marking contacts of all free outlets of line finder OZ2, through which subscriber's station *Ab* can be reached. The marking contacts of engaged outlets do not receive identification voltage, since the break contact $h^5{}_1$ of the busy relay of the first line finders connected to these outlets is open.

The stepping of line finders OZ2 and OZ1 is effected as follows:

The line finder OZ2 is actuated by energizing, from the control-device, a rotary magnet $SM_2$ by way of line $L_3$, the *a*-wiper of line finder RZ, the rest contact $h^1{}_2$ of the busy relay $H_2$ of line finder OZ2.

During the movement of the switch, the control device tests the marking contacts of line finder OZ2 by way of line $L_5$, the *c*-wiper of line finder RZ, the rest contact $h^3{}_2$ relay $H_2$ and the *d*-wiper of line finder OZ2.

As soon as a contact is reached which has an identification voltage, —60 v., the control-device interrupts the energizing circuit of the rotary magnet $SM_2$, due to which the line finder OZ2 is stopped. At the same instant, line $L_5$ attains earth potential, so that the outlet reached is engaged.

In order that this engagement occurs as soon as possible after the testing of the outlet and thus that the risk of a second switch stopping at the same outlet is reduced to a minimum, the stepping may be controlled with advantage by means of a control-device as described in the copending patent application filed December 22, 1948, Serial Number 66,679.

After the line finder OZ2 has been stopped, the busy relay $H_2$ is energized by sending a short pulse, by way of line $L_4$, the *b*-wiper of line finder RZ and rest contact $h^2_2$, through the winding of relay $H_2$. The relay completes a holding circuit for itself by way of the marking contact $h^4_2$ and the *d*-wiper of line finder RZ, the latter being connected to earth by way of line $L_6$ and contact *p* in the control-device. By way of the change-over contacts $h^1_2$, $h^2_2$ and $h^3_2$ the lines $L_3$, $L_4$ and $L_5$ are directly connected to wipers of the line finders OZ2. By opening the rest contact $h^3_2$, the earth potential would be removed from the marking contact of line finder OZ2. In order to avoid this, the relay $H_2$ must be such that the make contact $h^5_2$ closes before the rest contact $h^3_2$ opens. If desired, two relays may be used which are energized in succession.

At the instant the marking contact of line finder OZ2 attains earth potential, the remaining outlets of the group concerned are also marked engaged. If, for example, each of the resistances $R_a$ and resistance $R_1$ are equal, the potential of point $P_2$ will become —30 v. The control-device is arranged to respond and to stop a line finder only when a voltage less than —35 v. is found. The device consequently responds to a voltage of —60 v., but it does not respond to a voltage of —30 v. or to earth potential.

By engaging all outlets of the group giving access to the calling subscriber, a further second line finder is prevented from stopping at one of these outlets. Of course, a further line finder may stop at an outlet marked by a further line group. In the example under consideration, a further second line finder cannot find at the same time its way to a second calling subscriber in the same line group, since the call detector will cause a next following register to be engaged only after the first subscriber has been found.

After stepping of the second line finder OZ2, the first line finder OZ1 is stepped in an exactly similar manner as the second line finder OZ2.

After the first line finder OZ1 has been stopped, point T attains earth potential through line $L_5$, *c*-wiper of line finder RZ, make contact $h^3_2$, *c*-wiper of line finder OZ2, rest-contact $h^3_1$ and *d*-wiper of line finder OZ1, due to which the outlet of line finder OZ1 is engaged and the call detector is made inoperative.

The energisation of busy relay of $H_1$ should be delayed to such an extent that contact S is opened before rest contact $h^5_1$ opens, since otherwise the identification voltage of —60 v. would again be applied for a short time to the marking contacts of the group of outlets of line finder OZ2.

The rest contact $h^3_1$ may be opened only after make-contact $h^5_1$ has been closed.

Figure 3:
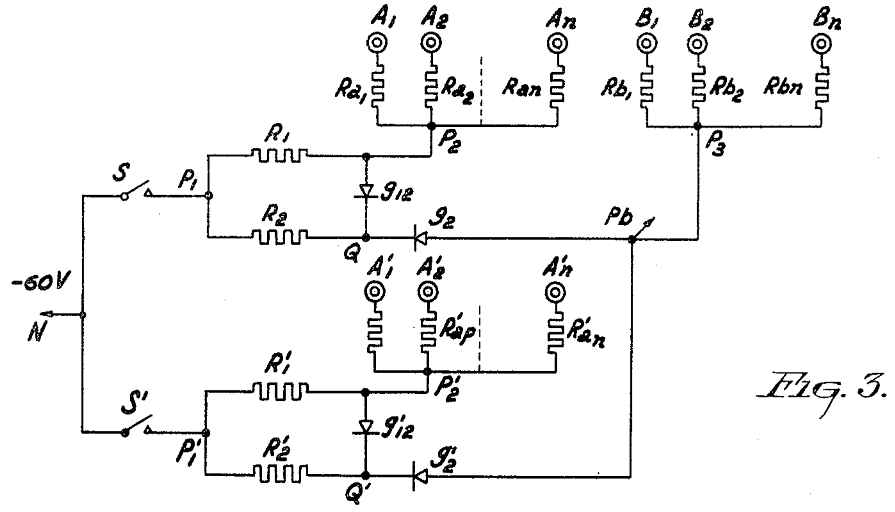
Figs. 3 and 4 illustrate the principle of the marking arrangement for marking line finders in two and three stages respectively.

Fig. 3 shows the principle of a distributor arrangement, which may be used in the case in which both the first and the second line finders are required to be marked. In Figs. 2, 3, and 4 corresponding elements are denoted by the same references.

To the outlets of a group of second line finders several groups of first line finders which are associated with various subscriber groups, are connected. Figure 3 shows the distributor arrangements of two of these groups of first line finders. The common points $P_2$, $P^1_2$ of these groups are connected, similarly to the arrangement shown in Fig. 2, each through a resistance $R_1$, $R^1_1$ to the common points $P_1$, $P^1_1$ of the corresponding subscriber groups.

The groups of second line finders are marked in a manner similar to that of the groups of first line finders, by connecting the marking contacts of the corresponding group of outlets of line finders RZ of the preceding stage each, by way of a rest contact of a busy relay and by way of a resistance $R_{b1}$–$R_{bn}$, to a common point $P_3$ of a group of second line finders. In Fig. 2, the resistance $R_9$ will then not be connected to the negative terminal N of the battery, but to point $P_3$.

Point $P_3$ is furthermore connected through series-combinations of a blocking-layer or rectifier cell and a resistance ($g_2R_2$ and $g^1_2$, $R^1_2$ respectively and so forth) to the common points of all subscriber groups which can be reached by way of the group of second line finders concerned. The rectifiers are polarized such that, upon a call in a definite subscriber group, only those groups of line finders are marked through which this subscriber group can be reached. If, for example, upon a call in the first subscriber group, contact S is closed, points $A_1$–$A_n$ of the first group of first line finders and points $B_1$–$B_n$ of the second line finders acquire a voltage of —60 v. This voltage, however, is not transmitted to points $A^1_1$–$A^1_n$ of the second group of first line finders, since the rectifier $g^1_2$ is intervening. In order to avoid, when no current flows, that the marking contacts become negatively charged by way of the high resistance constituted by a cut-off rectifier, it may be desirable to connect each of the common points to earth by way of a leakage resistance. It is essential that the control-device which, as a rule, does not have an infinitely high internal resistance, should not find an identification voltage at an undesired i. e. "unmarked" contact during the testing operation.

Between the common points $P_2$ and $P^1_2$ of the groups of first line finders and the connecting points Q and $Q^1$ of the resistances $R_2$ and $R^1_2$ and the rectifiers $g_2$ and $g^1_2$, are connected coupling rectifiers $g_{12}$ and $g^1_{12}$, respectively, the function of which appears from the following.

Let us now assume that a subscriber of the first group makes a call. Owing to the operation of the call detector associated with this group, the contact S is closed. After a register has been engaged, the line finder RZ is stepped to one of outlets marked, by way of points $B_1$–$B_n$, by a voltage of —60 v.

As soon as the line finder has been stopped, the marking contact of the engaged outlet, for example the marking contact connected to point $B_1$, is brought to earth potential. If, for example, the resistances $R_{b1}$–$R_{bn}$ are each equal to resistance $R_2$, the point $P_3$ acquires a potential of —30 v., so that the marking contacts of the outlets of the group concerned will also acquire a potential of —30 v. The control-device is adapted to respond only if the voltage of a marking contact is lower than —35 v. In this event, a further line finder RZ can not be stepped to one of the said outlets.

Point $P_2$ remains at —60 v., since the rectifier $g_{12}$ is such that a positive current can only flow from point $P_2$ to point Q. The engaged second line finder is then stepped to a marked outlet. After the switch has been stopped, the voltage of the marking contact is increased to earth potential, so that the potential of point $P_2$ is also increased. If resistance $R_1$ is equal to resistance $R_2$, and double the value of each resistance $R_{a1}$–$R_{an}$, the rectifier $g_{12}$ becomes conductive and points $P_2$ and $P_3$ assume a potential of —24 v.

Consequently, both the outlets of the second line finder and of the first line finder RZ, which give access to the calling subscriber, are marked engaged.

By energizing the busy relay $H_2$ of the second line finder, the earth-connection by way of rest contact $h^5{}_2$ to point $B_1$ is removed. Points $P_2$ and $P_3$ now acquire a potential —30 v., so that the outlets remain marked engaged.

Finally, the first line finder is stepped, whereupon contact S opens owing to the call detector becoming inoperative.

Consider now the case in which, during the finding of a subscriber of a first subscriber group, a call is initiated in a second subscriber group which is reached through the same group of second line finders. It is assumed that contact $S^1$ is closed before the line finder RZ is stepped. The identification voltage is fed to the outlets of RZ by way of resistance $R^1{}_2$. This results in that, if one of the outlets of RZ is engaged and the marking contact is connected to earth, the potential of point $P_3$ and consequently also that of the other marking contacts of the group rises to —40 v. only. To this voltage a control device does respond. The other outlets of the group have consequently not been marked engaged and the second line finder RZ can be stopped at one of the outlets marked by —40 v.: In this event, the other outlets are also marked engaged.

If the other line finder RZ has not reached a marked outlet, the potential of $P_2$ and $P_3$ will rise to —30 v. during the short time elapsing between the earthing of one of points $A_1$ to $A_n$ and energisation of a busy relay of a second line finder, so that the outlet group of RZ is engaged for a short time. If the other line finder RZ reaches one of the desired outlets in this period it turns further. The next instant, however, the earth connection of the marking contact of the first line finder RZ is interrupted, so that rectifier $g_2$ is not conductive and the marking contacts connected to point $P_3$ again assume a potential of —60 v.

Figure 4:
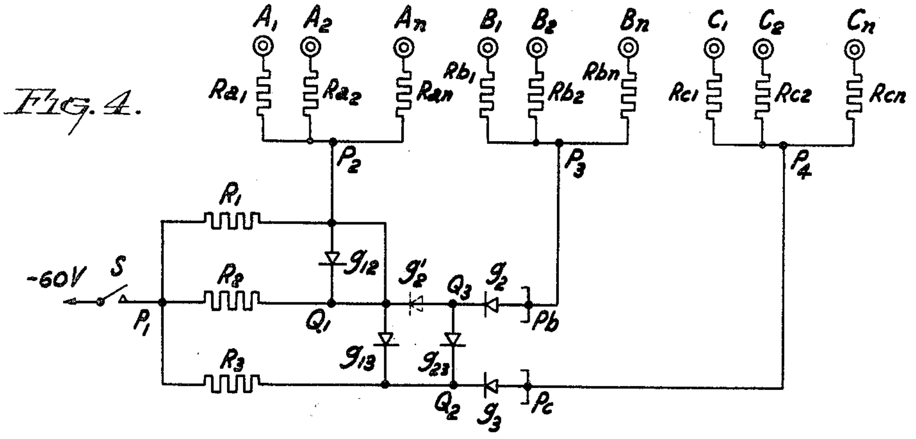

Fig. 4 shows an extension of the distributor arrangement shown in Fig. 3 if line finders of a stage preceding the second line finders are also required to be marked. It may, for example, occur that in the circuit-arrangement shown in Fig. 1 each register is not capable of reaching any subscriber by way of each outlet of line finder RK, so that a selection must be made from the outlets of the line finder RK of the register and one of the groups of outlets must be marked. This is shown diagrammatically in Fig. 1 by the dotted connection to point C.

Points $P_2$, $P_3$ and $P_4$ shown in Fig. 4 designate the common points of a group of first line finders OZ1, a group of second line finders OZ2 and a group of line finders RZ, respectively by way of which a connection to a definite subscriber group may be established. Points $P_2$, $P_3$ and $P_4$ are each connected, by way of resistance $R_1$, $R_2$ and $R_3$ respectively, to the common point $P_1$ of this subscriber group. In order to avoid that the line finders of points $P_3$ and/or $P_2$ are marked upon a call being initiated in a further line group, of which the distributor arrangements are connected to points $P_b$ and $P_c$, decoupling rectifiers $g_2$ and $g_3$ are connected between the point $P_4$ and the resistance $R_3$, and point $P_3$ and resistance $R_2$, respectively.

Between points $P_2$ and $Q_1$, $Q_3$ and $Q_2$, $P_2$ and $Q_2$ are connected coupling rectifiers $g_{12}$, $g_{23}$ and $g_{13}$, respectively, such that, if the outlets of a preceding stage are engaged, so that the potential of the associated common point is increased, the potential of the common points of the following stages does not increase. However, the potential of the common points of the following stages decreases with a decrease in potential of the associated common point.

Instead of being connected between points $Q_3$ and $P_3$ the rectifier $g_2$ may be connected, between $Q_1$ and $Q_3$ as shown in broken lines by the rectifier $g^1{}_2$.

The operation of the arrangement is exactly similar to that described with reference to Fig. 3 and it will be obvious that the arrangement for marking a greater number of stages may be extended further again in an exactly similar manner.

The resistances may, for example, be chosen to be such that the resistances $R_{c1}$–$R_{cn}$, are each equal to each of the resistances $R_1$, $R_2$ and $R_3$, and the ratio between each resistance $R_{a1}$–$R_{an}$, each resistance $R_{b1}$–$R_{bn}$ and each resistance $R_{c1}$–$R_{cn}$ is 1/3:1/2:1.

What I claim is:

1. In an automatic signalling system, at least first and second line finder groups in cascade relation for establishing a connection between a calling line and a register, the finders in each group having outlets in multiple connection, said line finders being provided with an actuating contact bank, a busying contact bank, a testing contact bank and a marking contact bank, and circuit means connecting the corresponding banks in cascade relation, electromagnetic means for actuating a finder and connected to a contact in the actuating contact bank of each finder, a common control device for positioning in succession first and second line finders along a route marked by identification voltages on said marking contacts, said control device applying a voltage to said actuating circuit for energizing said electromagnetic means, a busy relay connected to a contact in the busying contact bank of said first line finder and including a switch caused to open upon engagement of the associated finder, said control device applying an energizing voltage for said relay to said busying circuit, a first resistance connecting the marking contacts of the second line finder through said busy relay switch to a point common to the first group, a second resistance connecting said common point to a second point, and means responsive to a call on said line to impress a voltage on said second point whereby said second line finder is caused by said control device to stop at an outlet marked by said voltage, said control device being coupled to said testing circuit and upon stopping of said second finder acting to vary the voltage of the selected marking contact and hence that of the marking contacts of the second finder connected to the common point whereby a further finder is incapable of stopping during the call at one of the outlets of the group concerned.

2. In an automatic signalling system, a series of line finder groups in cascade relation for establishing a connection between a calling line and a register, the finders in the groups having corresponding outlets connected in multiple relation and provided with an actuating contact bank, a busying contact bank, a testing contact bank and a marking contact bank, and circuit means connecting the corresponding banks in cascade relation, electromagnetic means for actuating a finder and connected to a contact in the actuating contact bank of each finder, a common control device for positioning in succession selected finders in the series along a route marked by identification voltages on said marking contacts, said control device being connected to said actuating circuit and applying a voltage thereto for energizing said electromagnetic means, first and second busy relays connected to a contact in the busying contact bank of a finder in the first and second groups respectively in the series and including a switch caused to open upon engagement of the associated finder, said control device applying an energizing voltage for said relays to said busying circuit, a first resistance connecting the marking contacts of the second line finder through said first busy relay switch to a point common to the first group, a second resistance connecting said common point to a second point, a third resistance connecting the marking contacts of the first line finder through said second busy relay switch to a point common to the second group, a fourth resistance connecting the second common point to a further point, means responsive to a call on said line to impress a voltage on said second point whereby said second line finder is caused by said control device to stop at an outlet marked by said voltage, said control device being connected to said testing circuit and upon stopping of said second finder acting to vary the voltage of the selected marking contact and hence that of the marking contacts of the second finder connected to the common point whereby a further finder is incapable of stopping during the call at one of the outlets of the group concerned, a rectifier cell connecting the second common point to the further point, said cells being polarized such that the voltage of the further point does not change.

3. An automatic signalling system, as set forth in claim 2, including a further resistance connecting the common point of a group of line finders through which more than one line group can be reached to the point associated with each line, and a decoupling rectifier connected between the common point of a group of line finders and the junction of a resistance and a rectifier cell in the succeeding group, said decoupling rectifiers being polarized such that if voltage is fed to the point of a line group associated with each line, this voltage is transmitted only to marking contact of outlets by way of which the line group can be reached.

4. An automatic signalling system, as set forth in claim 3, further characterized in that upon positioning of a line finder to an outlet said control device varies the voltage of the marking contact such that the outlets of the group concerned as well as the outlets of line finders of preceding stages through which the calling line can be reached are marked engaged.

References Cited in the file of this patent

UNITED STATES PATENTS

| Number | Name | Date |
|---|---|---|
| 1,877,672 | Larsson | Sept. 13, 1932 |
| 2,152,889 | Jedrychowski | Apr. 4, 1939 |
| 2,376,346 | Deakin | May 22, 1945 |
| 2,424,281 | McClew | July 22, 1947 |